US 6,614,995 B2

(12) United States Patent
Tseng

(10) Patent No.: US 6,614,995 B2
(45) Date of Patent: Sep. 2, 2003

(54) APPARATUS AND METHOD FOR COMPENSATING AUTO-FOCUS OF IMAGE CAPTURE DEVICE BY UTILIZING RED-EYE ELIMINATING FUNCTION

(75) Inventor: Li-Wen Tseng, FengShan (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 0 days.

(21) Appl. No.: 09/994,689

(22) Filed: Nov. 28, 2001

(65) Prior Publication Data

US 2003/0099470 A1 May 29, 2003

(51) Int. Cl.[7] .......................... G03B 15/02; G03B 15/03
(52) U.S. Cl. .......................... 396/61; 396/106; 396/158
(58) Field of Search .......................... 396/61, 106, 157, 396/158, 97

(56) References Cited

U.S. PATENT DOCUMENTS 5,448,331 A * 9/1995 Hamada et al. ............. 396/106
6,259,862 B1 * 7/2001 Marino et al. .............. 396/106

* cited by examiner

Primary Examiner—Russell Adams
Assistant Examiner—Arthur A. Smith
(74) Attorney, Agent, or Firm—Bacon & Thomas, PLLC

(57) ABSTRACT

There are provided an apparatus and a method for compensating auto-focus of image capture device by utilizing red-eye eliminating function. An auto-focus module preliminarily determines a first distance from an object to the image capture device based on a first focal length evaluation value of the object, so as to perform a rough adjustment of the focal length. Whenever a red-eye eliminating device flashes to eliminate red-eye effect, the image sensor captures the image of the object so as to obtain a second focal length evaluation value of the object. The auto-focus module determines a second distance from the object to the image fetching device based on the second focal length evaluation value of the object, thereby performing a fine adjustment of the focal length.

13 Claims, 5 Drawing Sheets

APPARATUS AND METHOD FOR COMPENSATING AUTO-FOCUS OF IMAGE CAPTURE DEVICE BY UTILIZING RED-EYE ELIMINATING FUNCTION

BACKGROUND OF THE INVENTION

1. Field of the Invention

The present invention relates to an image capture device and, more particularly, to an apparatus and a method for compensating auto-focus of image capture device by utilizing red-eye eliminating function.

2. Description of Related Art

Generally, the auto-focus of an image capture device, such as a traditional camera or digital camera, is implemented as either an active focus or a passive focus device. The active focus device is widely employed in the point-and-shoot camera, which is similar to the traditional camera, but has an independent auto-focus device, such as a range finder consisting of an infrared transmitter and an infrared receiver, for measuring the distance between the camera and an object to be captured by detecting the brightness of the object. In contrast, the passive focus is widely employed in the medium/low level digital camera, which measures the distance between the camera and an object to be captured by analyzing a focal length evaluation value of the object obtained by a built-in image sensor.

However, for the active focus device, as mentioned above, an independent auto-focus device is required and the clearness of such an auto-focus device depends on the quality of the range finder. Furthermore, the cost is inevitably increased by incorporating such a range finder in the camera. As to the passive focus device, it is advantageous for saving cost by utilizing the built-in image sensor of the camera. Unfortunately, because the passive focus device relies on the focal length evaluation value, it presents a bad focus result when the object to be captured is in the dark state or the appearance of the object is too simple. FIG. 1 shows the graphs of focal length evaluation value versus focus position of lens for the dark and bright states. As shown, there is an obvious focal point in the bright state and thus the optimal focal length of the object can be easily determined. While in the dark state, there is no obvious focal point and the optimal focal length of the object is difficult to determine.

Therefore, it is desirable to provide a novel auto-focus apparatus and method to mitigate and/or obviate the aforementioned problems.

SUMMARY OF THE INVENTION

The object of the present invention is to provide an apparatus and a method for compensating auto-focus of image capture device by utilizing red-eye eliminating function, in which the low-cost passive auto-focus device is employed and the red-eye eliminating device, that is always activated before the flashlight is generated, is utilized as a light source to obtain a correct focus.

In one aspect of the present invention, an apparatus for compensating auto-focus of image capture device by utilizing red-eye eliminating function is provided. The apparatus comprises: an image sensor for capturing an image of an object so as to determine a focal length evaluation value of the object; a focal length adjuster for adjusting a focal length of the image capture device; a red-eye eliminating device capable of flashing for providing a red-eye eliminating function; and an auto-focus module for preliminarily determining a distance from the object to the image capture device based on the focal length evaluation value of the object captured by the image sensor to drive the focal length adjuster for performing a rough adjustment of the focal length of the image capture device, and when the red-eye eliminating device flashes for eliminating red-eye effect, further determining the distance from the object to the image capture device based on the focal length evaluation value of the object captured by the image sensor to drive the focal length adjuster, thereby performing a fine adjustment of the focal length of the image capture device.

In another aspect of the present invention, a method for compensating auto-focus of image capture device by utilizing red-eye eliminating function is provided. The method comprises the steps of: (A) using an image sensor to capture the image of an object so as to obtain a first focal length evaluation value, and using an auto-focus module to preliminarily determine a first distance from the object to the image capture device based on the first focal length evaluation value, thereby driving the focal length adjuster to perform a rough adjustment of the focal length of the image capture device; (B) driving a red-eye eliminating device to flash for at least one time to eliminate red-eye effect; and (C) whenever the red-eye eliminating device flashes to eliminate red-eye effect, using the image sensor to capture the image of the object so as to obtain a second focal length evaluation value of the object, and using the auto-focus module to determine a second distance from the object to the image fetching device based on the second focal length evaluation value of the object, thereby driving the focal length adjuster to perform a fine adjustment of the focal length of the image capture device.

Other objects, advantages, and novel features of the invention will become more apparent from the detailed description when taken in conjunction with the accompanying drawings.

DETAILED DESCRIPTION OF THE PREFERRED EMBODIMENT

Figure 1:
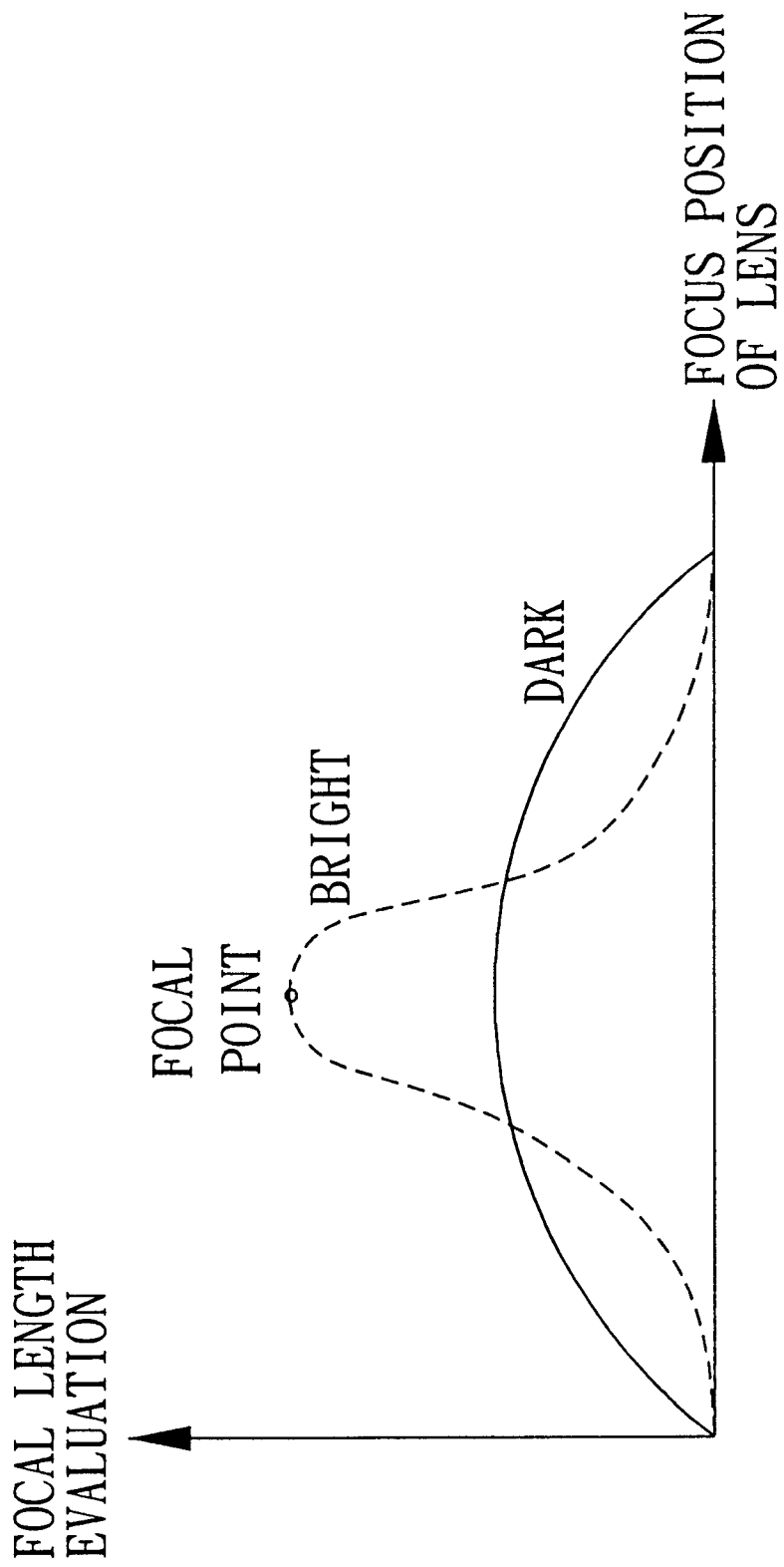
FIG. 1 is a graph showing the graphs of focal length evaluation value versus focus position of lens for the dark and bright states in using a conventional image capture device.
Figure 2:
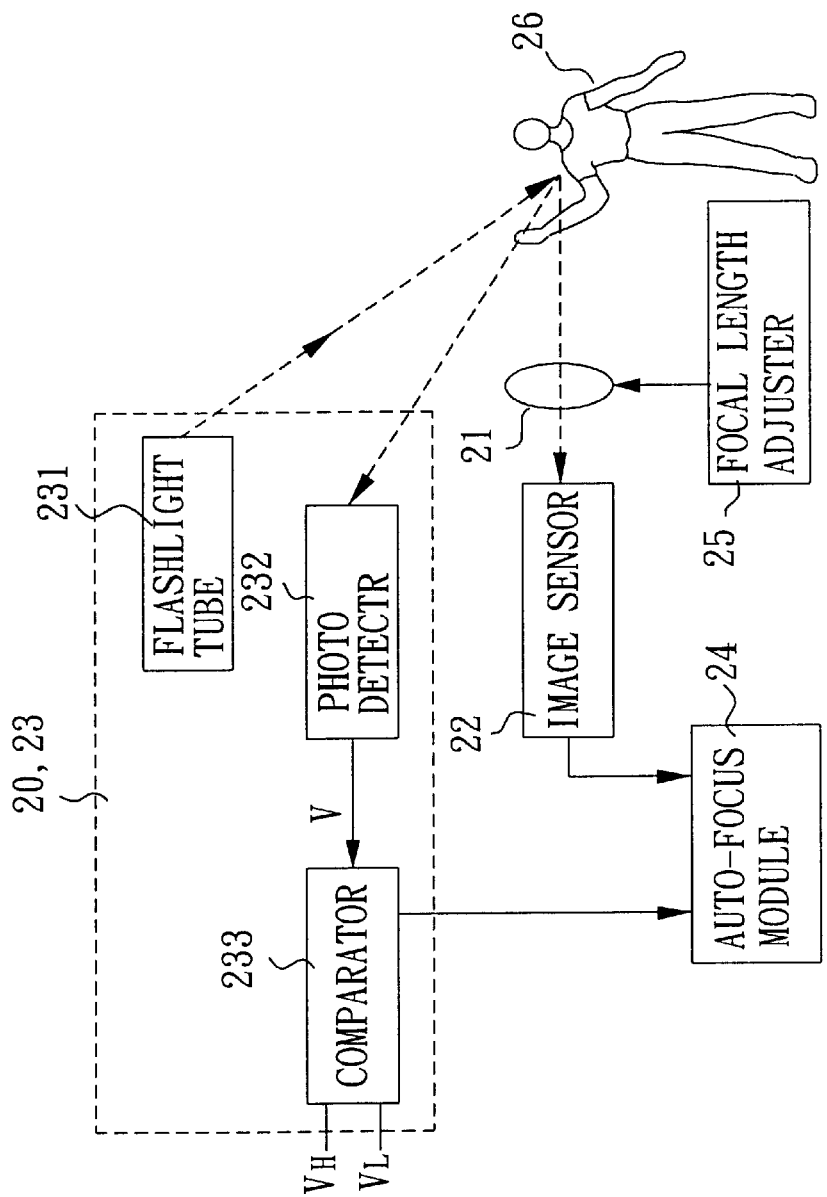
FIG. 2 is a block diagram of the apparatus for compensating auto-focus of image capture device by utilizing red-eye eliminating function in accordance with the present invention.

With reference to FIG. 2, there is shown an apparatus for compensating auto-focus of image capture device by utilizing red-eye eliminating function in accordance with a preferred embodiment of the present invention, which comprises a lens 21, an image sensor 22, a red-eye eliminating device 20, an auto-focus module 24, and a focal length adjuster 25. The red-eye eliminating device 20 can be a flashlight module of the image capture device or a light emitting diode (LED) module. In this preferred embodiment, the red-eye eliminating device 20 is a flashlight module 23 consisting of a flashlight tube 231, a photo detector 232, and a comparator 233.

The lens 21 permits the light from an object 26 to be transmitted to the image capture device. The image sensor 22 is provided to capture the image of the object 26 for the image capture device through the lens 21, and send the captured image data to the auto-focus module 24 so as to analyze and determine the focal length evaluation value for adjusting the focus. The flashlight module 23 is used to provide an auxiliary light for taking a picture and a red-eye eliminating light. When the flashlight tube 231 flashes to provide the red-eye eliminating light, the photo detector 232 detects the brightness of the object 26 and converts the detected brightness into a voltage signal V for being transmitted to the comparator 233. The comparator 233 compares the level of the voltage signal V with a predefined high voltage $V_H$ and a predefined low voltage $V_L$, respectively. If the voltage signal V is higher than the predefined high voltage $V_H$, it indicates that the brightness is too large. If the voltage signal V is lower than the predefined low voltage $V_L$, it indicates that the brightness is insufficient. If the voltage signal V is between the high voltage $V_H$ and the low voltage $V_L$, it indicates that the brightness is appropriate. Based on this comparison result and the image information captured by the image sensor 22, the auto-focus module 24 determines the distance from the object 26 to the image capture device, so as to drive the focal length adjuster 25 for achieving the auto-focus function.

Figure 3:
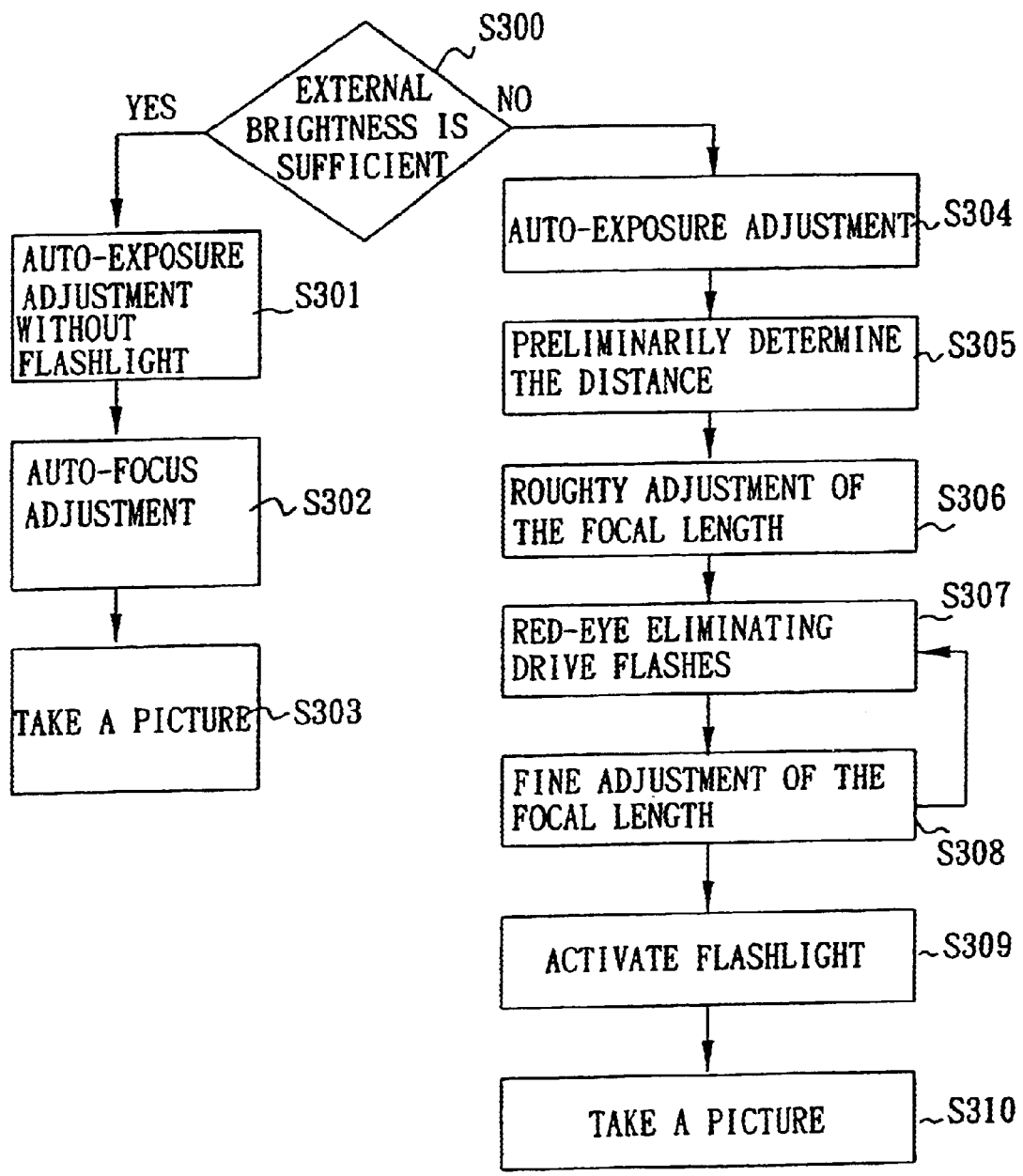
FIG. 3 is a flow chart illustrating a process of capturing image with the method for compensating auto-focus of image capture device by utilizing red-eye eliminating function in accordance with the present invention.

With reference to FIG. 3, there is shown a flow chart illustrating the method for compensating auto-focus of image capture device by utilizing red-eye eliminating function in accordance with the present invention. At first, when the auto-exposure device of the image capture device determines that the brightness is sufficient (step S300), an auto-exposure adjustment without flashlight and an auto-focus adjustment are performed (steps S301 and S302), and then a picture is taken (step S303). If step S300 determines that the external brightness is insufficient and the flashlight is required, step S304 is executed to perform an auto-exposure adjustment, and then an auto-focus adjustment is performed as follows. In step S305, the distance from the object 26 to the image capture device is preliminarily determined based on the focal length evaluation value of the object 26 captured by the image sensor 22, so as to drive the focal length adjuster 25 to roughly adjust the focal length of the image capture device (step S306). Next, whenever the flashlight module 23 flashes for eliminating the red-eye effect (step S307), the image sensor 22 captures the image of the object 26 again, and a corresponding focal length evaluation value is obtained. The auto-focus module 24 further determines the distance from the object 26 to the image capture device based on this focal length evaluation value of the object 26, so as to drive the focal length adjuster 25 to perform a fine adjustment of focal length of the image capture device (step S308). After performing steps S307 and S308 for at least one time, the focal length of the image capture device can be adjusted to a correct value. Finally, the flashlight is activated (step S309) for taking a picture (step S310).

Figure 4:
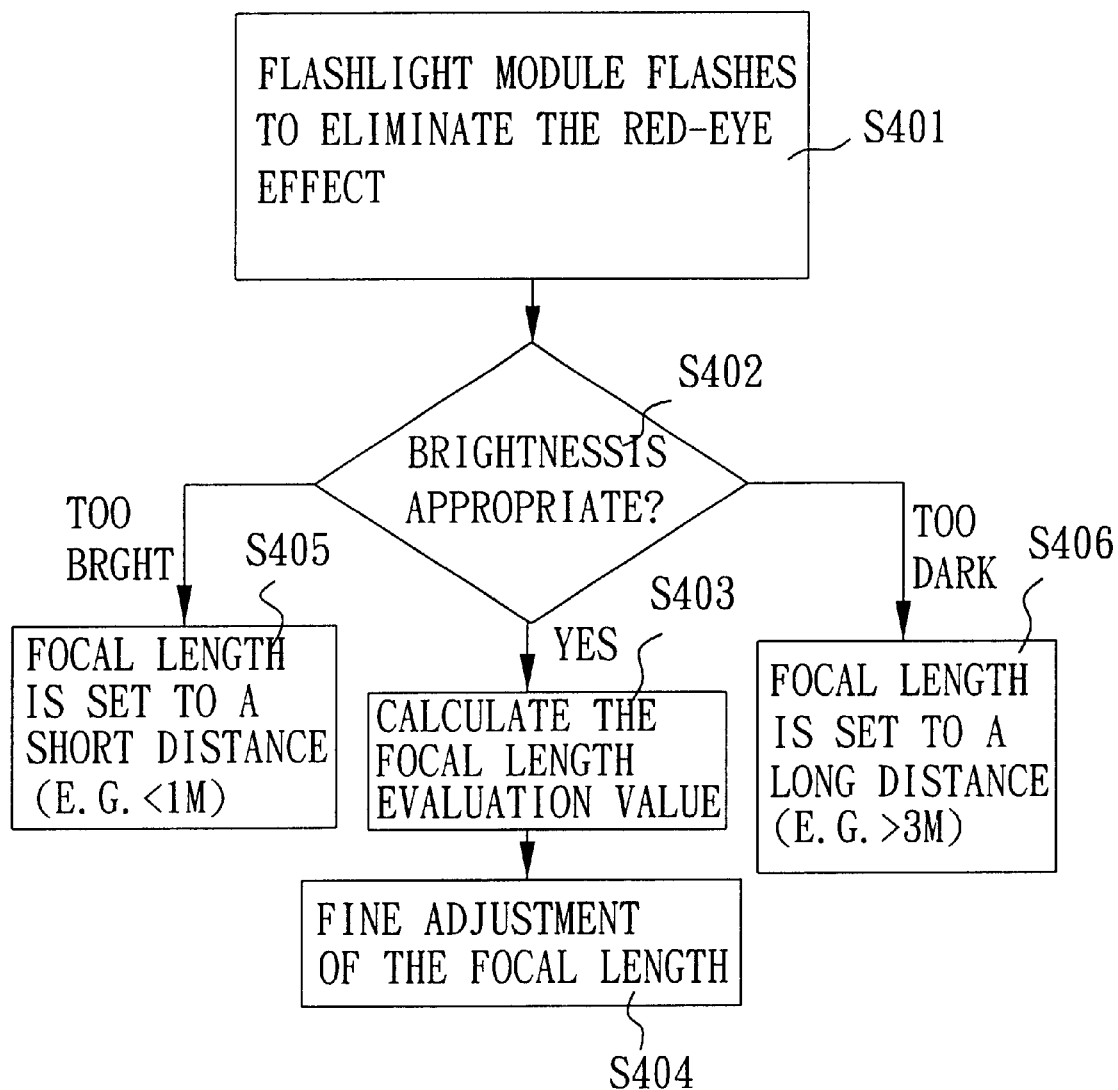
FIG. 4 is a flow chart illustrating a fine adjustment of focal length when the flashlight module flashes to eliminate the red-eye effect.

With reference to FIG. 4, there is shown a flow chart illustrating the fine adjustment of focal length when the flashlight module 23 flashes to eliminate the red-eye effect. As shown, when the flashlight tube 231 flashes (step S401), the photo detector 232 determines whether the brightness of the light is appropriate (step S402). That is, the brightness is converted by the photo detector 232 into a voltage signal V for being compared with the predefined high voltage $V_H$ and low voltage $V_L$, respectively. If the voltage signal V is higher than the predefined high voltage $V_H$, it indicates that brightness is too large, and thus the focal length is set to a predefined short distance, such as smaller than 1 meter (step S405). If the voltage signal V is lower than the predefined low voltage $V_L$, it indicates that the brightness is insufficient, and the focal length is set to a predefined long distance, such as larger than 3 meters (step S406). If the voltage signal V is between the high voltage $V_H$ and the low voltage $V_L$, it indicates that the brightness is appropriate. Thus, the auto-focus module 24 calculates the focal length evaluation value (step S403), and finally drives the focal length adjuster 25 (step S404) to perform a fine adjustment of the focal length.

Figure 5:
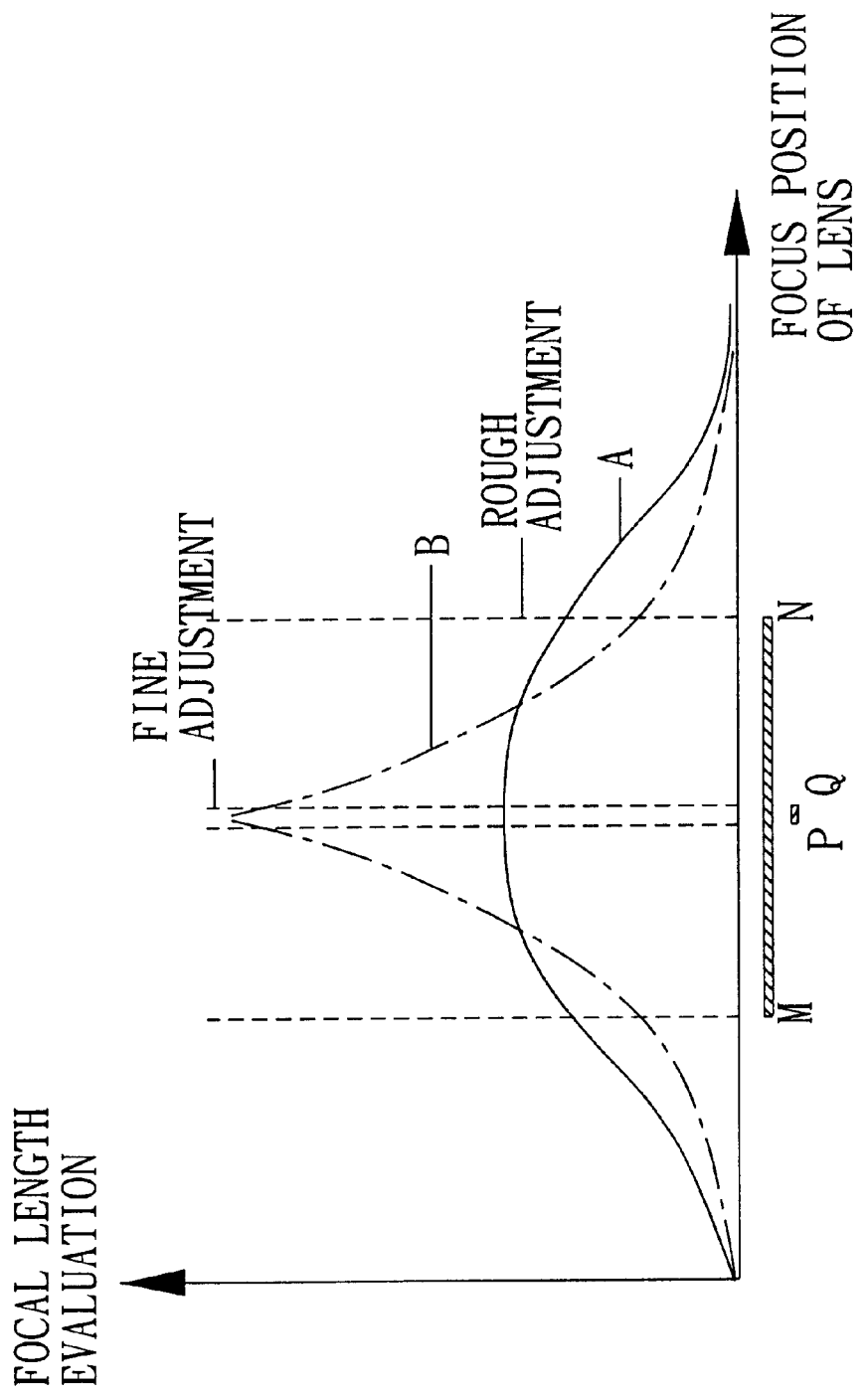
FIG. 5 is a graph showing the focal length evaluation values of an object to be taken before and after light compensation of the red-eye eliminating device.

With the present apparatus and method, it is able to utilize the red-eye eliminating device, that is already existed in an image capture device, as a light source to obtain a correct focus. FIG. 5 is a graph showing the focal length evaluation values of an object to be taken before and after light compensation of the red-eye eliminating device. The curve A represents the focal length evaluation value before the red-eye eliminating device flashes while the curve B represents the focal length evaluation value after the red-eye eliminating device flashes. As shown, the focal length from point M to point N is a range of rough adjustment while the focal length from point P to point Q is a range of fine adjustment. It is seen that, with the use of the red-eye eliminating device for compensating the auto-focus, the focal point can be easily determined thereby accomplishing the purpose of automatic focus.

In view of the foregoing, the present invention is based on the low-cost passive auto-focus device, and utilizes the red-eye eliminating device, which is always activated before the flashlight is generated, as a light source to obtain a correct focus. Therefore, the drawbacks of the passive auto-focus device in the dark state can be eliminated. Moreover, when the flashlight is required, it indicates that the brightness of the object to be captured is insufficient and the accuracy of the auto-focus may be negatively influenced. At this moment, by using the red-eye eliminating light to perform focus compensation, it can immediately determine the focal length evaluation value by the light-compensated image to obtain an ideal focus result. In addition, if the captured image is too bright or too dark to be compensated, the distance between the object to be captured and the image capture device is directly determined without determining the focal length evaluation value by the light-compensated image.

Although the present invention has been explained in relation to its preferred embodiment, it is to be understood that many other possible modifications and variations can be made without departing from the spirit and scope of the invention as hereinafter claimed.

What is claimed is:

1. An apparatus for compensating an auto-focus of an image capture device by utilizing a red-eye eliminating function, comprising:

an image sensor for capturing an image of an object so as to determine a focal length evaluation value of the object;

a focal length adjuster for adjusting a focal length of the image capture device;

a red-eye eliminating device capable of flashing for providing a red-eye eliminating function; and an auto-focus module for preliminarily determining a distance from the object to the image capture device based on the focal length evaluation value of the object captured by the image sensor to drive the focal length adjuster for performing a rough adjustment of the focal length of the image capture device, and when the red-eye eliminating device flashes for eliminating a red-eye effect, further determining the distance from the object to the image capture device based on the focal length evaluation value of the object captured by the image sensor to drive the focal length adjuster, thereby performing a fine adjustment of the focal length of the image capture device, wherein the red-eye device flashes a plurality of times, and whenever the red-eye device flashes said plurality of times, the auto-focus module drives the focal length adjuster to perform a fine adjustment of the focal length of the image capture device for each flash.

2. The apparatus as claimed in claim 1, wherein, when the red-eye eliminating device flashes to provide brightness larger than a predefined first value, the focal length adjuster is driven by the auto-focus module to set the focal length to a predefined short distance.

3. The apparatus as claimed in claim 2, wherein the red-eye eliminating device is a flashlight module.

4. The apparatus as claimed in claim 1, wherein, when the red-eye eliminating device flashes to provide brightness smaller than a predefined second value, the focal length adjuster is driven by the auto-focus module to set the focal length to a predefined long distance.

5. The apparatus as claimed in claim 4, wherein the red-eye eliminating device is a flashlight module.

6. The apparatus as claimed in claim 1, wherein the red-eve eliminating device is a flashlight module and the flashlight module comprises:

a flashlight tube capable of flashing;

a photo detector for detecting brightness from the flashlight tube and converting the brightness into a voltage signal; and a comparator for comparing the voltage signal and voltage values representing predefined first and second values.

7. The apparatus as claimed in claim 1, wherein, after preliminarily determining the distance from the object to the image capture device, the auto-focus module drives the focal length adjuster to set the focal length to a first focal involution range.

8. The apparatus as claimed in claim 7, wherein, after further determining the distance from the object to the image capture device, the auto-focus module drives the focal length adjuster to set the focal length to a second focal involution range smaller than the first focal involution range.

9. A method for compensating auto-focus of an image capture device by utilizing a red-eye eliminating function, the image capture device including an image sensor, a focal length adjuster, a red-eye eliminating device, and an auto-focus module, the method comprising the steps of:

(A) using the image sensor to capture the image of an object so as to obtain a first focal length evaluation value, and using the auto-focus module to preliminarily determine a first distance from the object to the image capture device based on the first focal length evaluation value, thereby driving the focal length adjuster to perform a rough adjustment of the focal length of the image capture device;

(B) driving the red-eye eliminating device to flash a plurality of times to eliminate a red-eye effect; and (C) whenever the red-eye eliminating device flashes to eliminate the red-eye effect, using the image sensor to capture the image of the object so as to obtain a second focal length evaluation value of the object, and using the auto-focus module to determine a second distance from the object to the image fetching device based on the second focal length evaluation value of the object, thereby driving the focal length adjuster to perform fine adjustment of the local length of the image capture device, wherein whenever the red-eye device flashes said plurality of times, the auto-focus module drives the focal length adjuster to perform the fine adjustment of the focal length of the image capture device for each flash.

10. The method as claimed in claim 9, wherein, in step (C), when the red-eye eliminating device flashes to provide brightness larger than a predefined first value, the focal length adjuster is driven by the auto-focus module to set the focal length to a predefined short distance.

11. The method as claimed in claim 10, wherein the predefined short distance is one meter.

12. The method as claimed in claim 9, wherein, when the red-eye eliminating device flashes to provide brightness smaller than a predefined second value, the focal length adjuster is driven by the auto-focus module to set the focal length to a predefined long distance.

13. The method as claimed in claim 12, wherein the predefined long distance is three meters.

\* \* \* \* \*